United States Patent
Iwata et al.

(10) Patent No.: US 9,554,137 B2
(45) Date of Patent: Jan. 24, 2017

(54) IMAGE RECEIVING DEVICE, IMAGE TRANSMISSION SYSTEM, AND IMAGE RECEIVING METHOD

(71) Applicant: Renesas Electronics Corporation, Kawasaki-shi (JP)

(72) Inventors: Kenichi Iwata, Kawasaki (JP); Tetsuya Shibayama, Kawasaki (JP); Katsushige Matsubara, Kawasaki (JP); Ren Imaoka, Kawasaki (JP); Seiji Mochizuki, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 0 days.

(21) Appl. No.: 14/752,883

(22) Filed: Jun. 27, 2015

(65) Prior Publication Data

US 2016/0029021 A1 Jan. 28, 2016

(30) Foreign Application Priority Data

Jul. 22, 2014 (JP) ................................ 2014-148574

(51) Int. Cl.
*G06K 9/36* (2006.01)
*H04N 19/117* (2014.01)
(Continued)

(52) U.S. Cl.
CPC .......... *H04N 19/117* (2014.11); *H04N 19/124* (2014.11); *H04N 19/164* (2014.11);
(Continued)

(58) Field of Classification Search
CPC .... H04N 19/117; H04N 19/86; H04N 19/124; H04N 19/18; H04N 19/44; H04N 19/172; H04N 19/164; H04N 19/174
(Continued)

(56) References Cited

U.S. PATENT DOCUMENTS 8,326,052 B2 * 12/2012 Hattori ................. H04N 19/176
375/240.29
8,625,924 B2 1/2014 Tanaka et al.
(Continued)

FOREIGN PATENT DOCUMENTS

JP 2008-022404 A 1/2008
JP 2013-239995 A 11/2013

*Primary Examiner* — Kanjibhai Patel
(74) *Attorney, Agent, or Firm* — McGinn IP Law Group, PLLC.

(57) ABSTRACT

To improve an image recognition rate by quickly changing a parameter in a proper manner without being affected by a transmission delay of an image encoding stream in an image receiving device that recognizes a decoded image obtained by decoding the received image encoding stream. The image receiving device includes a data receiving unit, a parameter changing unit, a decoding unit, and an image recognition unit. The data receiving unit receives an image encoding stream including image encoding data and the parameter. The parameter changing unit changes the parameter received by the data receiving unit, that is, the parameter specified for encoding performed by a sender, to a value suitable for image recognition performed in the subsequent stage. The decoding unit generates the image decoding data by decoding the received image encoding data according to the changed parameter. The image recognition unit performs image recognition on the image decoding data.

18 Claims, 9 Drawing Sheets

(51) Int. Cl.
*H04N 19/86* (2014.01)
*H04N 19/124* (2014.01)
*H04N 19/18* (2014.01)
*H04N 19/172* (2014.01)
*H04N 19/164* (2014.01)
*H04N 19/174* (2014.01)
*H04N 19/44* (2014.01)

(52) U.S. Cl.
CPC ......... *H04N 19/172* (2014.11); *H04N 19/174* (2014.11); *H04N 19/18* (2014.11); *H04N 19/44* (2014.11); *H04N 19/86* (2014.11)

(58) Field of Classification Search
USPC .............................. 382/232–233; 375/240.29
See application file for complete search history.

(56) References Cited

U.S. PATENT DOCUMENTS

| | | | |
|---|---|---|---|
| 2009/0290805 A1 | 11/2009 | Hattori | |
| 2011/0007186 A1* | 1/2011 | Yonaha | H04N 5/2352 348/239 |
| 2011/0118965 A1* | 5/2011 | Aben | G01C 21/3476 701/117 |
| 2011/0243470 A1* | 10/2011 | Noguchi | H04N 19/176 382/239 |

* cited by examiner

IMAGE RECEIVING DEVICE, IMAGE TRANSMISSION SYSTEM, AND IMAGE RECEIVING METHOD

CROSS-REFERENCE TO RELATED APPLICATIONS

The disclosure of Japanese Patent Application No. 2014-148574 filed on Jul. 22, 2014 including the specification, drawings and abstract is incorporated herein by reference in its entirety.

The present invention relates to an image receiving device, an image transmission system, and an image receiving method and is particularly suitably used for an image receiving device, an image transmission system, and an image receiving method that involve image recognition.

BACKGROUND

In a transmission system for displaying image information on, for example, an original image acquired by a camera, the temporarily encoded and compressed original image is transmitted and then a decoded image obtained by decoding is displayed. Generally, an enormous amount of image information is transmitted and thus transmission bandwidths need to be reduced in transmission paths such as a network. Such an image transmission system may require image recognition instead of or in addition to display. For example, image recognition is required to detect a suspect using a monitoring camera, identify a distance between vehicles and a road sign using an on-board camera, or avoid a collision between a pedestrian and another vehicle or another obstacle.

Japanese Unexamined Patent Publication No. 2013-239995 discloses an on-board camera system that recognizes images using compressed and expanded pictures to assist driving of vehicles. Depending on the running condition of a vehicle and a driving assistance application (e.g., a lane passing alarm, collision avoidance, and rear moving image display), encoding control information including an image size in a moving image format, a color format, a frame rate, and a bit depth is transmitted to the encoder control unit of a moving image transmitter, a sender changes an encoding parameter based on the encoding control information, and then a moving image stream is generated.

Japanese Unexamined Patent Publication No. 2008-22404 discloses an image encoding device that includes a feature quantity extracting unit upstream of image encoding, calculates the flatness (activity) of an image in a feature quantity calculating unit, and improving image quality by determining a parameter for a deblocking filter included in image encoding.

SUMMARY

As a result of examinations on Japanese Unexamined Patent Publication No. 2013-239995 and Japanese Unexamined Patent Publication No. 2008-22404 by the inventors, other problems were found as follows:

An image is typically encoded according to an encoding method of generating images with visually reduced noise or an encoding method of determining an encoding mode so as to minimize a generated bit quantity. In the case of image recognition of a decoded image, such an encoding method is not always suitable. Thus, it is understood that a recognition rate cannot be sufficiently improved on a decoded image that is compressed or expanded according to a typical image encoding method.

The image encoding method described in Japanese Unexamined Patent Publication No. 2008-22404 is suitable for displaying images. Unfortunately, an image encoding method suitable for image recognition is not provided. Proposed feature quantities for image recognition include a feature quantity featuring edge information including, for example, an EOH (Edge of Orientation Histogram) feature quantity and an HOG (Histograms of Oriented Gradients) feature quantity. In deblocking filtering suitable for displaying images, edge information is lost, reducing a feature quantity for image recognition.

It is assumed that an image recognition rate is improved in Japanese Unexamined Patent Publication No. 2013-239995. As described above, information including an image size in a moving image format, a color format, a frame rate, and a bit depth is minimized for image recognition depending on the running condition of a vehicle and the kind and purpose of a driving assistance application. However, an encoding parameter is not optimized. Transmission is delayed on the networks of encoding control information and a moving image stream, disadvantageously increasing a delay time from transmission of encoding control information from a moving image receiving device to decoding of the moving image stream.

A solution to these problems will be described below. Other problems and novel features will become apparent from the description and the accompanying drawings.

The configuration of an embodiment will be described below.

An image receiving device including a data receiving unit, a parameter changing unit, a decoding unit, and an image recognition unit is configured as follows: the data receiving unit receives an image encoding stream including image encoding data and parameters, the parameter changing unit can change parameters received by the data receiving unit, the decoding unit decodes the received image encoding data and generates image decoding data according to the parameters changed by the parameter changing unit, and the image recognition unit performs image recognition on the decoded image decoding data.

An effect obtained by the embodiment will be simply described below.

Specifically, a parameter can be suitably changed without being affected by transmission delay, thereby improving an image recognition rate. This is because the parameter transmitted with an image encoding stream from an encoder in an image transmitting device can be optionally changed to a parameter suitable for image recognition in the image receiving device.

DETAILED DESCRIPTION

1. The Outline of Embodiments

First, the outline of a representative embodiment disclosed in the present application will be described below. Reference numerals in parentheses in the drawings of the outline of the representative embodiments merely provide illustrations included in the concept of the constituent elements indicated by the reference numerals.

[1] <Image Receiving Device that Changes and Decodes a Decoding Parameter Received from an Encoder>

An image receiving device (1) according to the representative embodiment disclosed in the present application includes a data receiving unit (11), a parameter changing unit (12), a decoding unit (13), and an image recognition unit (14). The image receiving device (1) is configured as follows:

The data receiving unit receives an image encoding stream (33) including image encoding data and parameters. The parameter changing unit can change the parameter received by the data receiving unit. The decoding unit generates image decoding data (35) by decoding an image encoding stream (34) including the image encoding data received by the data receiving unit and the parameter changed by the parameter changing unit. The image recognition unit performs image recognition on the image decoding data.

Thus, the parameter can be quickly changed in a proper manner without being affected by transmission delay, thereby improving an image recognition rate. This is because the parameter included the image encoding stream are transmitted by the encoder in an image transmitting device and then can be properly changed to a parameter suitable for image recognition in the image receiving device.

[2] <Changing of a Parameter Based on an Index Indicating the Accuracy of Image Recognition>

In article 1, the image recognition unit calculates an index (31) indicating the accuracy of image recognition in the process of image recognition. The parameter changing unit changes the parameter received by the data receiving unit, based on the index indicating the accuracy of image recognition calculated in the process of image recognition.

This can change the parameter more suitably for image recognition.

[3] <Changing of the Parameter Based on the Environmental Information of the Image Receiving Device>

In article 1 or 2, the parameter changing unit changes the parameter received by the data receiving unit, based on the environmental information (30) of the image receiving device.

This can change the parameter so as to perform image recognition more suitably for the environment of the image receiving device.

[4] <Changing of the Parameter According to a Running Condition>

In article 3, the image receiving device is mounted on a vehicle. An image acquired by a camera mounted on the vehicle is encoded by an image encoding device, and then an image encoding stream generated by the image encoding is received by the data receiving unit.

The parameter changing unit changes the parameter received by the data receiving unit, according to the running condition of the vehicle.

Thus, in the image receiving device mounted in an on-board camera system, the parameter can be changed more suitably for an object of image recognition required depending on the running condition of the vehicle.

[5] <Changing of the Parameter of a Deblocking Filter>

In one of articles 1 to 4, the decoding unit includes a deblocking filter (135) . The parameter changing unit changes, as the parameter received by the data receiving unit, at least one of a parameter indicating whether to use the deblocking filter for the image encoding data and the filter coefficient of the deblocking filter.

Thus, in the case of an insufficiently high image recognition rate, the strength of the deblocking filter is reduced to avoid suppression of the high frequency components of an image or reduce the degree of suppression, thereby improving the recognition rate.

[6] <Changing of a Quantization Parameter>

In one of articles 1 to 4, the decoding unit includes an inverse quantization unit (133). The parameter contains a quantization parameter for quantization included in encoding for generating the image encoding data. The parameter changing unit changes the quantization parameter contained in the parameter received by the data receiving unit and then supplies the quantization parameter to the inverse quantization unit.

Thus, in the case of an insufficiently high image recognition rate, the quantization parameter is increased to amplify and emphasize prediction error components, thereby improving the recognition rate.

[7] <Changing of an Orthogonal Transform Coefficient>

In one of articles 1 to 4, the decoding unit includes an orthogonal inverse transform unit. The parameter contains an orthogonal transform coefficient for orthogonal transformation included in encoding performed to generate the image encoding data. The parameter changing unit changes the orthogonal transform coefficient contained in the parameter received by the data receiving unit and then supplies the coefficient to the orthogonal inverse transform unit.

Thus, in the case of an insufficiently high image recognition rate, the orthogonal transform coefficient can be changed to improve the recognition rate. For example, the high frequency range of the orthogonal transform coefficient is deleted, allowing the frequency components of a decoded image inputted to the image recognition unit to be matched with frequency components required for image recognition.

[8] <Parameter Transmitting Unit (Index Indicating the Accuracy of Image Recognition)>

In article 1, the image receiving device further includes a parameter transmitting unit (17).

The image recognition unit calculates the index (31) indicating the accuracy of image recognition in the process of image recognition. The parameter changing unit changes the parameter (33) received by the data receiving unit, based on the index indicating the accuracy of image recognition calculated in the process of image recognition.

The parameter transmitting unit transmits the index (31) to an image transmitting device (4) that has transmitted the generated image encoding stream. The index (31) indicating the accuracy of image recognition is calculated in the process of image recognition.

This can change the parameter more suitably for image recognition. Furthermore, an encoding parameter corresponding to the parameter can be changed in the image encoding device that generates the image encoding stream.

[9] <The Environmental Information of the Parameter Transmitting Unit (the Environmental Information of the Image Receiving Device)>

In article 8, the parameter changing unit changes the parameter (33) received by the data receiving unit, based on the environmental information (30) of the image receiving device.

The parameter transmitting unit transmits an index indicating the environmental information (30) of the image receiving device, to the image transmitting device (4) that has transmitted the generated image encoding stream.

This can change the parameter more suitably for environmental information on image recognition. Furthermore, the encoding parameter can be changed based on the environmental information of the image receiving device in the image encoding device that generates the image encoding stream.

[10] <Parameter Transmitting Unit (Running Condition)>

In article 9, the image receiving device is mounted on a vehicle. An image acquired by the camera mounted on the vehicle is encoded by an image encoding device, and then the image encoding stream generated by the image encoding is received by the data receiving unit. The parameter changing unit changes the parameter received by the data receiving unit, according to the running condition of the vehicle. The parameter transmitting unit transmits an index indicating the running condition of the vehicle, to the image transmitting device that transmits the generated image encoding stream.

Thus, in the image receiving device mounted in the on-board camera system, the parameter can be changed more suitably for an object of image recognition required depending on the running condition of the vehicle. Also in the image encoding device that generates the image encoding stream, the encoding parameter can be changed according to the running condition of the vehicle.

[11] <Display Decoder>

In one of articles 1 to 10, the image receiving device further includes a decoding unit (15), which is different from the foregoing decoding unit, and a display unit (16).

The data receiving unit supplies the received image encoding stream to the another decoding unit. According to a parameter included in the image encoding stream, the another decoding unit decodes image the encoding data included in the image encoding stream, generates image decoding data different from the foregoing image decoding data, and then supplies the image decoding data to the display unit.

Thus, the image decoding data decoded according to the parameter changed suitably for image recognition is supplied to the image recognition unit, whereas the image decoding data decoded according to the parameter suitable for original display is supplied to the display unit. This properly applies the parameters to the image recognition and the original display, respectively.

Moreover, the image recognition unit receives the image decoding data decoded according to the parameter changed suitably for image recognition and the image decoding data decoded according to the parameter suitable for display before the change of the parameter. This allows image recognition by the image recognition unit according to a difference between the two segments of image decoding data, thereby further improving the accuracy of image recognition.

[12] <Image Transmission System>

The representative embodiment disclosed in the present application is an image transmission system including the image receiving device (1) and the image transmitting device (4) according to any one of articles 1 to 11. The image transmitting device includes the image encoding device that receives an original image and generates the image encoding data by encoding the original image according to the encoding parameter corresponding to the parameter. The image transmitting device supplies the image encoding stream to the image receiving device.

Thus, an image transmission system can be provided so as to quickly change the parameter in a proper manner without being affected by transmission delay, thereby improving an image recognition rate. The image transmitting device and the image encoding device included in the image transmitting device do not need to be provided with constituent elements corresponding to the parameter changing unit, allowing a combination of a typical image encoding device and a typical image transmitting device.

[13] <On-Board Camera>

In article 12, the image transmission system is mounted on the vehicle including a camera that acquires a surrounding image as the original image and an on-board network. The image transmitting device and the image receiving device are coupled to each other so as to communicate with each other via the on-board network.

This can suppress transmission delay in the on-board image transmission system that recognizes an image acquired by the on-board camera. Since a time period from imaging to image recognition may be shortened, safety can be improved in prevision and avoidance of danger during driving.

[14] <An Image Receiving Method that Changes and Decodes the Decoding Parameter Received from the Encoder>

In an image receiving method (1) according to the representative embodiment disclosed in the present application, the data receiving unit (11), the parameter changing unit (12), the decoding unit (13), and the image recognition unit (14) are provided in the following configuration:

The data receiving unit receives the image encoding stream (33) including the image encoding data and the parameters. The parameter changing unit can change the parameter inputted in the data receiving unit (S1 to S4). The decoding unit generates image decoding data (35) by decoding the image encoding data received by the data receiving unit and the image encoding stream (34) including the parameter changed by the parameter changing unit (S5). The image recognition unit performs image recognition on the image decoding data.

Thus, the image receiving method can be provided so as to quickly change the parameter in a proper manner without being affected by transmission delay, thereby improving an image recognition rate. This is because the encoder can optionally change the parameter to be transmitted by a sender with the image encoding stream, to a parameter suitable for image recognition by a receiver.

[15] <Changing of the Parameter Based on the Index Indicating the Accuracy of Image Recognition>

In article 14, the image recognition unit calculates the index (31) indicating the accuracy of image recognition in the process of image recognition. The parameter changing unit changes the parameter received by the data receiving unit, according to the index indicating the accuracy of image recognition calculated in the process of image recognition (S3, S4).

This can change the parameter more suitably for image recognition.

[16] <Changing of the Parameter Based on the Environmental Information of the Image Receiving Device>

In articles 14 and 15, the parameter changing unit changes the parameter received by the data receiving unit, based on the environmental information (30) of the image receiving device for which the image receiving method is used (S1).

This can change the parameter so as to perform image recognition more suitably for the environment of the image receiving device.

[17] <Changing of the Parameter According to a Running Condition>

In article 16, the image receiving device is mounted on a vehicle. An image acquired by the camera mounted on the vehicle is encoded by the image encoding device, and then the image encoding stream generated by the image encoding is received by the data receiving unit. The parameter changing unit changes the parameter received by the data receiving unit, according to the running condition of the vehicle (S1).

Thus, in the image receiving device mounted in an on-board camera system, the parameter can be changed more suitably for an object of image recognition required for the running condition of the vehicle.

[18] <Changing of the Parameter of the Deblocking Filter>

In one of articles 14 to 17, the decoding unit includes the deblocking filter (135). The parameter changing unit changes, as the parameter received by the data receiving unit, at least one of the parameter indicating whether to use the deblocking filter for the image encoding data and the filter coefficient of the deblocking filter (S3, S4).

Thus, in the case of an insufficiently high image recognition rate, the strength of the deblocking filter is reduced to avoid suppression of the high frequency components of an image or reduce the degree of suppression, thereby improving the recognition rate.

[19] <Changing of the Quantization Parameter>

In one of articles 14 to 17, the decoding unit includes the inverse quantization unit (133). The parameter contains the quantization parameter for quantization included in encoding for generating the image encoding data. The parameter changing unit changes the quantization parameter contained in the parameter received by the data receiving unit and then supplies the quantization parameter to the inverse quantization unit.

Thus, in the case of an insufficiently high image recognition rate, the quantization parameter is increased to amplify and emphasize prediction error components, thereby improving the recognition rate.

[20] <Changing of the Orthogonal Transform Coefficient>

In one of articles 1 to 4, the decoding unit includes an orthogonal inverse transform unit. The parameter contains an orthogonal transform coefficient for orthogonal transformation included in encoding performed to generate the image encoding data. The parameter changing unit changes the orthogonal transform coefficient contained in the parameter received by the data receiving unit and then supplies the coefficient to the orthogonal inverse transform unit.

Thus, in the case of an insufficiently high image recognition rate, the orthogonal transform coefficient can be changed to improve the recognition rate. For example, the high frequency range of the orthogonal transform coefficient is deleted, allowing the frequency components of a decoded image inputted to the image recognition unit to be matched with frequency components required for image recognition.

2. Detailed Description

Embodiments will be more specifically described below.

[First Embodiment]

Figure 1:
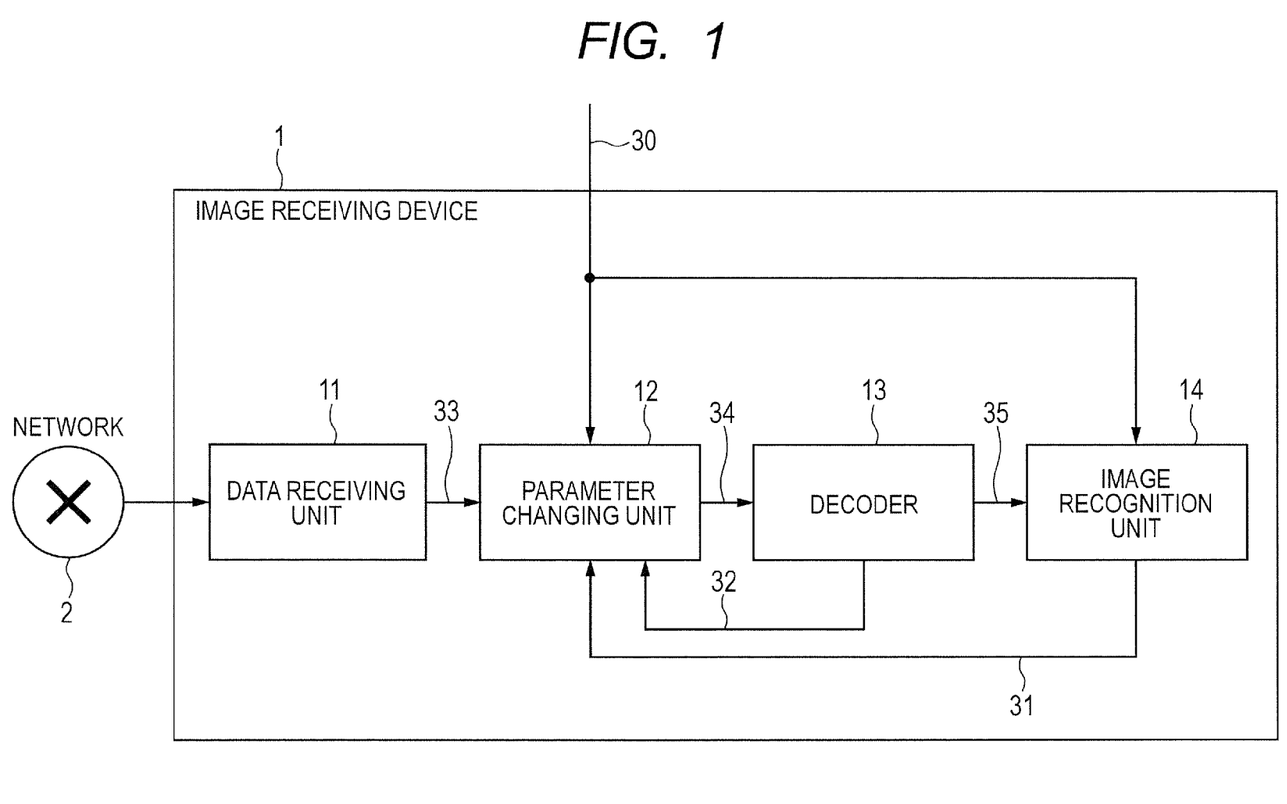
FIG. 1 is a block diagram showing a configuration example of an image receiving device according to a first embodiment.

FIG. 1 is a block diagram showing a configuration example of an image receiving device 1 according to a first embodiment.

The image receiving device 1 includes a data receiving unit 11, a parameter changing unit 12, a decoder 13, and an image recognition unit 14. The data receiving unit 11 receives packet data transmitted through a network 2 and extracts an image encoding stream 33 from the packet data. The image encoding stream 33 is encoded image data called an elementary stream. Some elementary streams conform to, for example, encoding standards such as MPEG-2 (MPEG: Moving Picture Experts Group) and H. 264, HEVC (High Efficiency Video Coding) with a double layer structure of at least a sequence level and a picture level, each including a header portion and a data portion. The header portion contains various parameters for encoding. The data portion is decoded by a typical decoder using the parameter as a decoding parameter. The parameter changing unit 12 changes the parameter in the image encoding stream 33 and supplies an image encoding stream 34, which contains the changed parameter, to the decoder 13. The data portion of the image encoding stream 34 is decoded by the decoder 13 using the changed parameter in the image encoding stream 34 as a decoding parameter, generating a decoded image 35. The image recognition unit 14 detects, identifies, and tracks an object or the like in the decoded image 35.

A parameter changing method by the parameter changing unit 12 will be specifically described later. The parameter in a header contained in the image encoding stream 33 received through the network 2 is changed from a value generated and added by an encoder unit to another value. The parameter generated and added by the encoder unit is optimized so as to suppress image degradation on the assumption that a decoded image is viewed by a person. The parameter is not always set at a proper value for recognition in the image recognition unit 14. Thus, the parameter changing unit 12 changes the parameter in the header contained in the image encoding stream 33 received through the network 2, to the proper value for recognition in the image recognition unit 14. This can improve an image recognition rate in the image recognition unit 14. The parameter can be quickly changed in a proper manner without being affected by transmission delay through the network 2, unlike in the case of a change of the value of a parameter generated by an encoder. This is because the parameter can be optionally changed only by the image receiving device 1 to a parameter value suitable for image recognition.

At this point, the image recognition unit 14 preferably calculates an index 31 indicating the accuracy of image recognition in the process of image recognition and then supplies the index 31 to the parameter changing unit 12, and the parameter changing unit 12 preferably changes the parameter according to the index 31 indicating the accuracy of image recognition. This is because the parameter value can be changed more suitably for image recognition conducted by the image recognition unit 14.

The index 31 indicating the accuracy of image recognition is, for example, an index indicating the accuracy of results of image detection, recognition, and tracking in the image recognition unit 14, information about recognition regions, or image recognition region information. The accuracy of recognition and detection results can be determined by a threshold value indicating the degree of similarity in each process, or the number of stages of passing a discriminator. The accuracy of recognition and detection results can be determined by various methods using algorithms and applications for recognition and detection as follows:

In a main technique of detecting objects such as a face and a sign, a local feature quantity and a statistical learning technique are combined. For example, in face detection, multiple Haar-like feature quantities are combined to include a face detector. The detector is coupled to weak discriminators in cascade. A feature quantity most suitable for discrimination is selected using AdaBoost from the multiple local feature quantities. In this case, the accuracy of detection is indicated by the number of stages of passing the cascaded weak discriminators.

In recognition of specific objects such as a sign, learning can be performed in advance. A feature quantity determined beforehand by a reference image and a corresponding point search from an input image allow recognition of signs. The value indicating the degree of similarity is thresholded, allowing an euclidean distance from the threshold value to indicate the degree of similarity.

In object tracking, for example, it is assumed that a movement is identical at each point in a local region according to KLT (Kaneda Lucas Tomasi). The destination of a feature point is determined on the assumption that only a parallel movement occurs in a region in a micro time. The feature point is determined using the degree of similarity of feature quantities (euclidean distance) in, for example, SIFT (Scale Invariant Feature Transform) before and after the movement, allowing the euclidean distance of feature quantities to serve as an index.

The parameter changing unit 12 can change a parameter value according to statistical information 32 outputted from the decoder 13, instead of or in addition to the index 31 indicating the accuracy of image recognition. The statistical information 32 includes various parameter values and the distribution of the parameter values in the decoder 13.

When the parameter changing unit 12 changes a parameter value, reference information is not limited to the index 31 indicating the accuracy of image recognition and the statistical information 32. The information may contain any kind of data obtained in the receiving unit.

Alternatively, the parameter changing unit 12 can change a parameter value according to the environmental information 30 of the image receiving device 1 instead of or in addition to the index 31 indicating the accuracy of image recognition and the statistical information 32. In this case, the environmental information 30 may include various kinds of information. For example, the environmental information 30 may be information on the applications of image recognition by the recognition unit 14, the applications being executed by the image receiving device 1. Thus, the parameter value can be changed so as to perform image recognition more suitably for the environment of the image receiving device 1.

In a more specific example, the present embodiment is applicable to an image receiving device in a driving assistance system including an on-board camera. Specifically, the image receiving device 1 is mounted on a vehicle e.g., an automobile, an image acquired by the on-board camera is encoded by the image encoding device, a generated image encoding stream is transmitted through on-board networks including a CAN (Controller Area Network), and then the image encoding stream is received by the data receiving unit 11 of the image receiving device 1. According to the running condition of the vehicle, the parameter changing unit 12 of the image receiving device 1 changes the value of the parameter received by the data receiving unit 11 to a value suitable for image recognition of the image recognition unit 14. At this point, the environmental information 30 may be, for example, application information on image recognition of central dividers and side strips, white lines indicating lanes, or preceding vehicles in high speed driving, image recognition of pedestrians, signs, and obstacles in low and medium speed driving, and image recognition of stoppers, lines indicating stopping positions, or obstacles in reversing of vehicles. Additionally, information on vehicle driving conditions or environmental information in the daytime or nighttime or a clear or rainy weather may be used.

Thus, in the image receiving device mounted in the on-board camera system, a parameter value can be changed more suitably for an object of image recognition required according to the driving condition of the vehicle.

The parameter changed by the parameter changing unit 12 will be described below.

Figure 2:
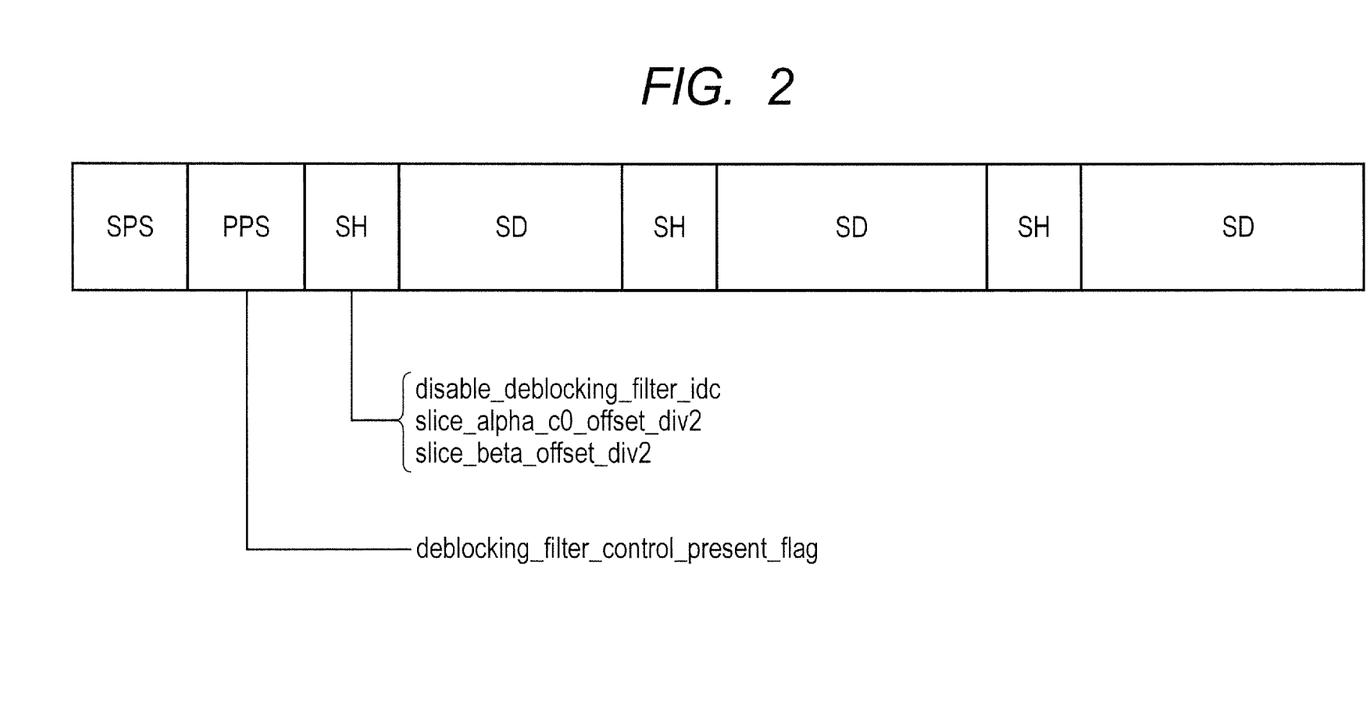
FIG. 2 is an explanatory drawing showing an example of an image encoding stream including parameters.

FIG. 2 is an explanatory drawing showing an example of the image encoding stream containing the parameter. FIG. 2 shows, as an example of the parameter, an image data structure in H. 264 advanced video coding for generic audiovisual services. SPS stands for a sequence parameter set, PPS stands for a picture parameter set, SH stands for a slice header, and SD stands for slice data. The image encoding stream is multiplexed into, for example, three levels of sequence, picture, and slice. The image encoding stream includes SPS, PPS, and SH serving as header portions at each level and SD serving as a data portion at the slice level that is the lowest level. An encoding parameter at each level is defined for SPS, PPS, and SH serving as the header portions at each level. PPS contains, for example, deblocking_filter_control_present_flag. SH contains, for example, disable_deblocking_filter_idc, slice_alpha_c0_offset_div2, slice_beta_offset_div2, and so on. These parameters define a filter coefficient for determining whether to perform deblocking filtering or performing processing. The parameter is properly changed so as to control the frequency components of an image signal inputted to the image recognition unit 14.

The parameter to be changed by the parameter changing unit 12 is not limited to a parameter for the deblocking filter. A prediction mode, a quantization parameter, an orthogonal transform coefficient, and so on may be used. Changing the quantization parameter to a larger value amplifies and emphasizes, for example, prediction error components. Changing the orthogonal transform coefficient controls the frequency components of an image signal, thereby changing the processing accuracy of the image recognition unit 14.

Figure 3:
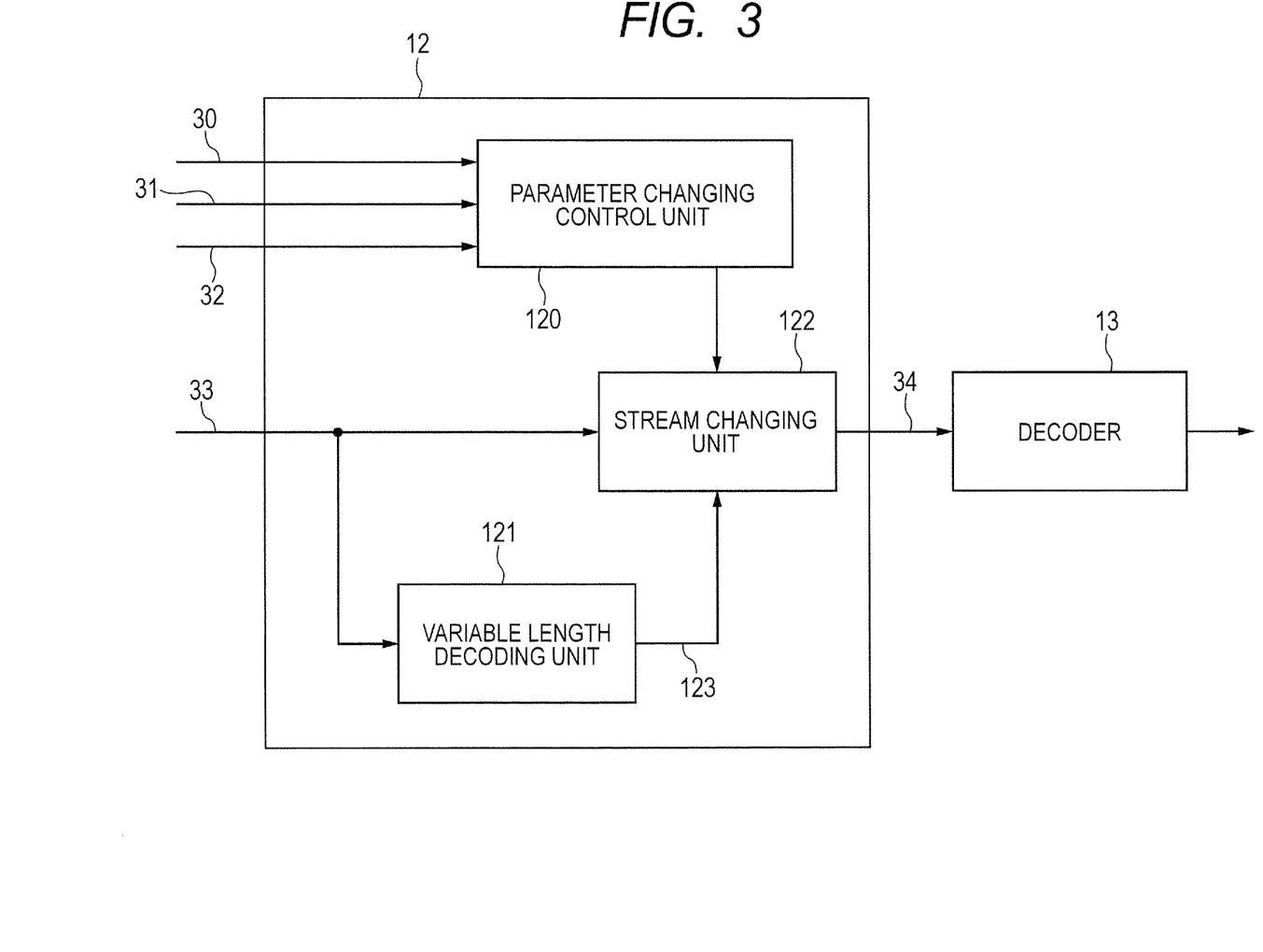
FIG. 3 is a block diagram showing a configuration example of a parameter changing unit and a decoder unit.

A more specific configuration example of the parameter changing unit 12 and the decoder 13 will be described below.

FIG. 3 is a block diagram showing the configuration example of the parameter changing unit 12 and the decoder 13.

The parameter changing unit 12 includes a parameter changing control unit 120, a variable length decoding unit 121, and a stream changing unit 122 and is coupled to the decoder 13. The image encoding stream 33 supplied from the data receiving unit 11 is inputted to the variable length decoding unit 121. The variable length decoding unit 123 decodes the inputted image encoding stream 33 and extracts a parameter 123 of SPS or PPS. The parameter changing control unit 120 decides whether to change the parameter extracted by the variable length decoding unit 123, according to the feedback information 30, 31, and 32. The stream changing unit 122 changes the parameter 123 to be changed in the image encoding stream 33, and generates the image encoding stream 34 containing the changed parameter in the head portion. In this case, the parameter in the image encoding stream 34 outputted from the parameter changing unit 12 is changed within an encoding standard range without departing from the standard. This does not cause an error in the typical decoder 13. Specifically, the design resource of the decoder 13 can be used, thereby reducing the cost.

The variable length decoding unit 121 may be capable of decoding only the header portion of the image encoding stream 33 and have the variable length decoding function of the data portion.

Figure 4:
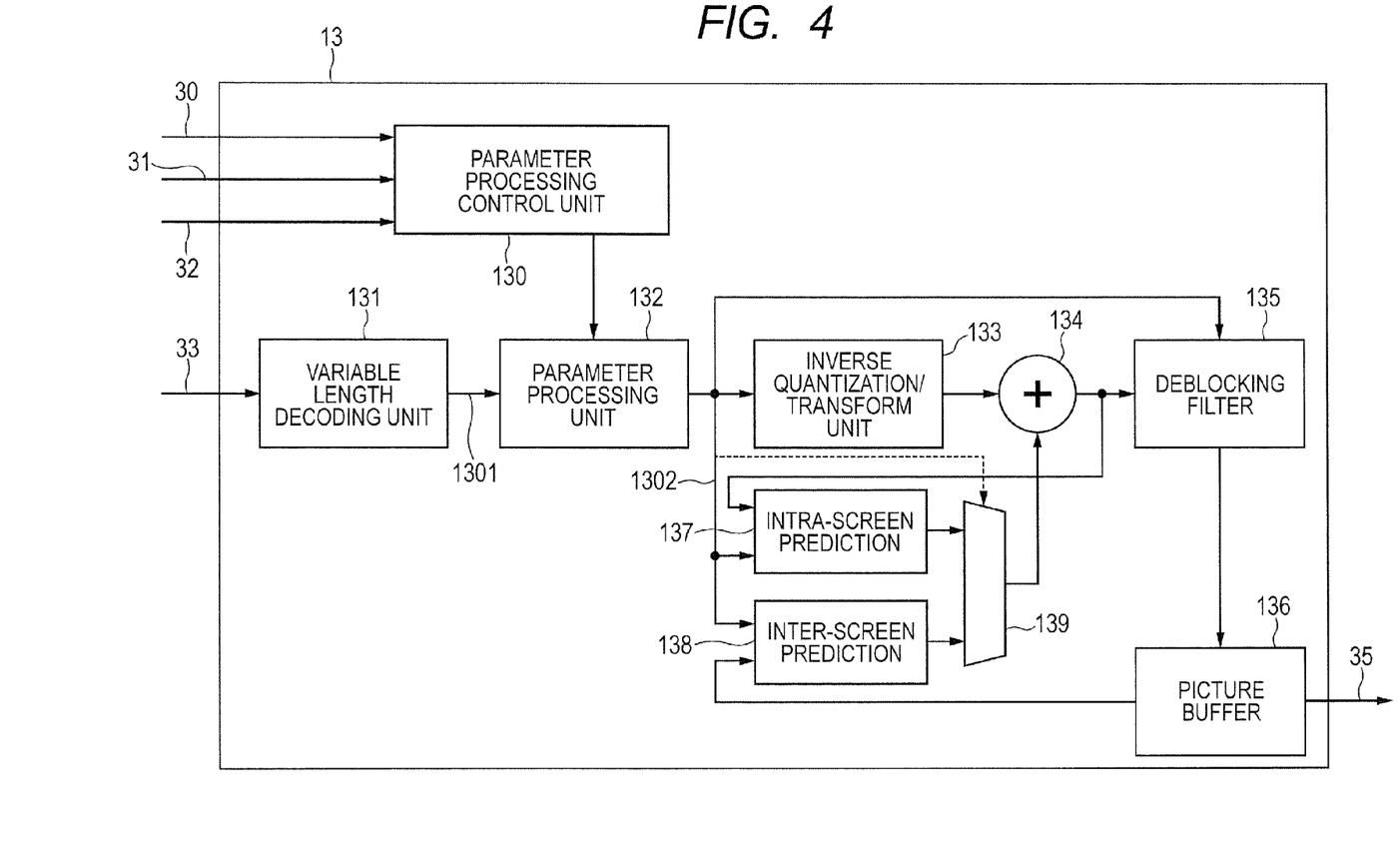
FIG. 4 is a block diagram showing another configuration example of the parameter changing unit and the decoder unit.

FIG. 4 is a block diagram showing another configuration example of the parameter changing unit 12 and the decoder 13. In this example, the parameter changing unit 12 is integrated with the decoder 13 having the parameter changing function. The dividing patterns and names of the functional blocks of the parameter changing unit 12 and the decoder 13 are expediently determined and can be changed as necessary. The decoder 13 in FIG. 4 includes a parameter processing control unit 130, a variable length decoding unit 131, a parameter processing unit 132, an inverse quantization/transform unit 133, an adder 134, a deblocking filter 135, a picture buffer 136, an intra-screen prediction unit 137, an inter-screen prediction unit 138, and a prediction mode selecting unit 139. The image encoding stream 33 supplied from the data receiving unit 11 is inputted to the variable length decoding unit 131. The variable length decoding unit 131 decodes the image encoding stream 33 and outputs a parameter 1301, e.g., a header parameter, an orthogonal transform coefficient, and an encoding mode. The parameter processing control unit 130 decides whether to change the parameter included in the parameter 1301, according to the feedback information 30, 31, and 32. The parameter processing unit 132 optionally changes the parameter included in the parameter 1301 and then outputs a changed parameter 1302 to the processing units (133 to 139) in the decoder 13. The inverse quantization/transform unit 133 performs inverse quantization and inverse transform and then outputs pixel data on prediction errors. The pixel data is combined with an intra-screen prediction image (outputted from 137) selected by the selector 139 or an inter-screen prediction image (outputted from 138) in the adder 134, and then the data is processed in the deblocking filter 135 so as to be stored in the picture buffer 136. The image data in the picture buffer 136 is outputted as the decoded image 35; meanwhile, the image data is used as a reference image of the inter-screen prediction unit 138.

In the configuration example, data can be optionally changed in addition to the parameter inputted to the processing units (133 to 139) in the decoder 13. For example, the high frequency range of the orthogonal transform coefficient is deleted so as to control the frequency components of the decoded image 35.

The steps of changing the parameter will be described below.

Figure 5:
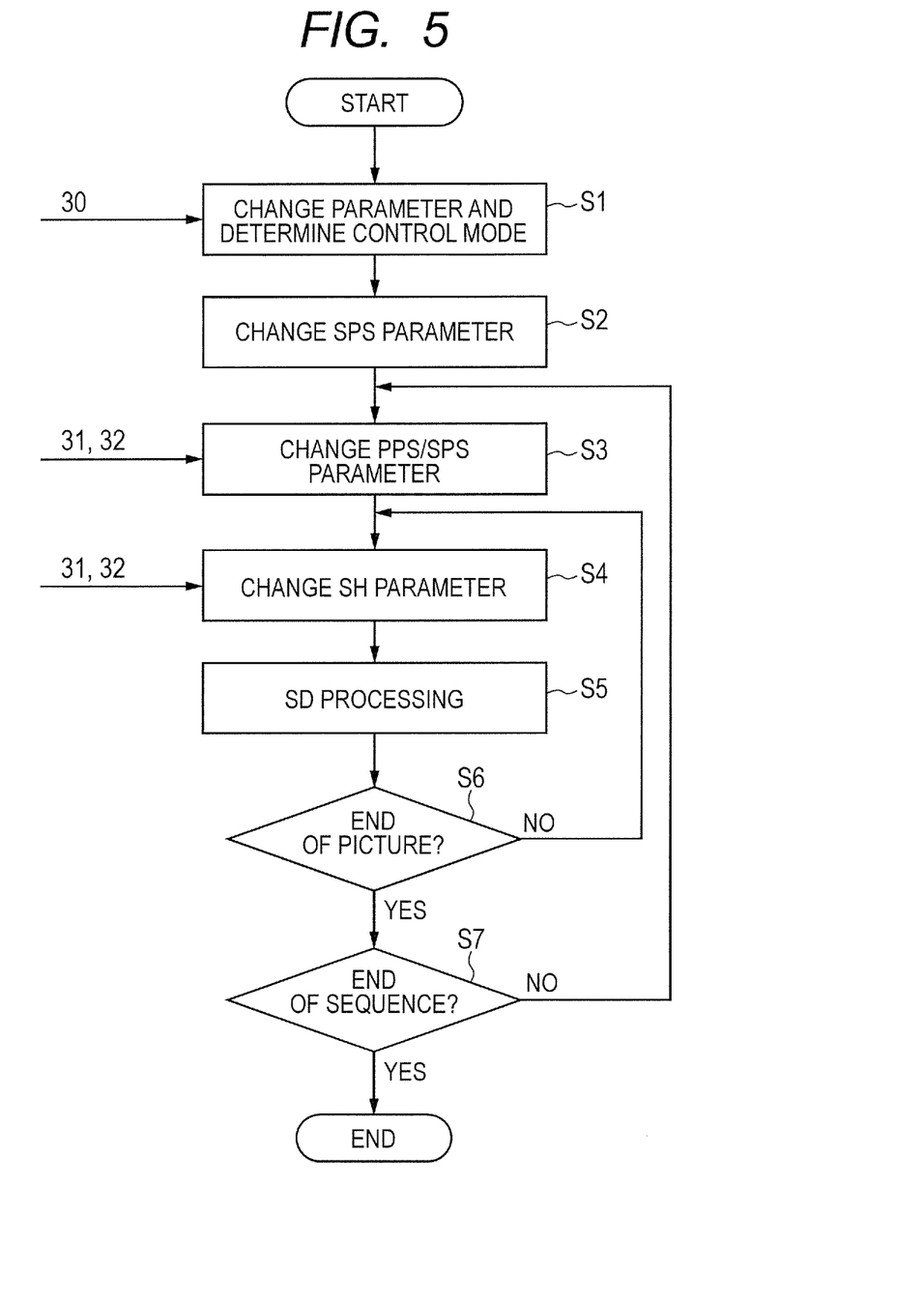
FIG. 5 is a flowchart showing a flow of changing parameters and decoding.

FIG. 5 is a flowchart showing a flow of changing the parameter and decoding. A parameter changing flow is indicated at each of the levels of sequence (Seq), picture (Pic), and slice. First, the parameter to be changed in the image encoding stream 33 is determined according to the environmental information 30 (S1), and then the parameter SPS is changed at the sequence level (S2). After that, the parameter in PPS/SPS is changed for each picture according to the information 31 and 32 (S3). According to the encoding standard in which slices are available, a parameter in the slice header (SH) is changed for each slice according to the information 31 and 32 (S4). After the parameter is changed, slice data (SD) processing (decoding) is performed (S5). The decoding is continued until the end of the picture (S6) and the end of the sequence (S7).

Figure 6:
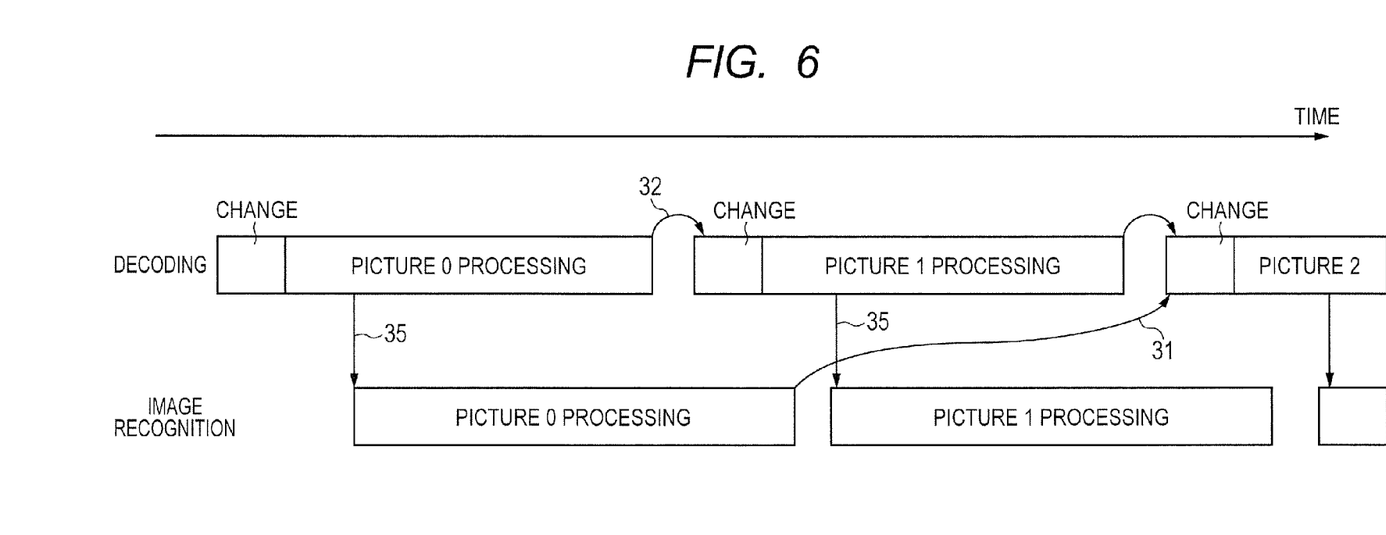
FIG. 6 is a timing chart schematically showing an example of a parameter changing operation and a decoding operation (feedback for each picture)
Figure 7:
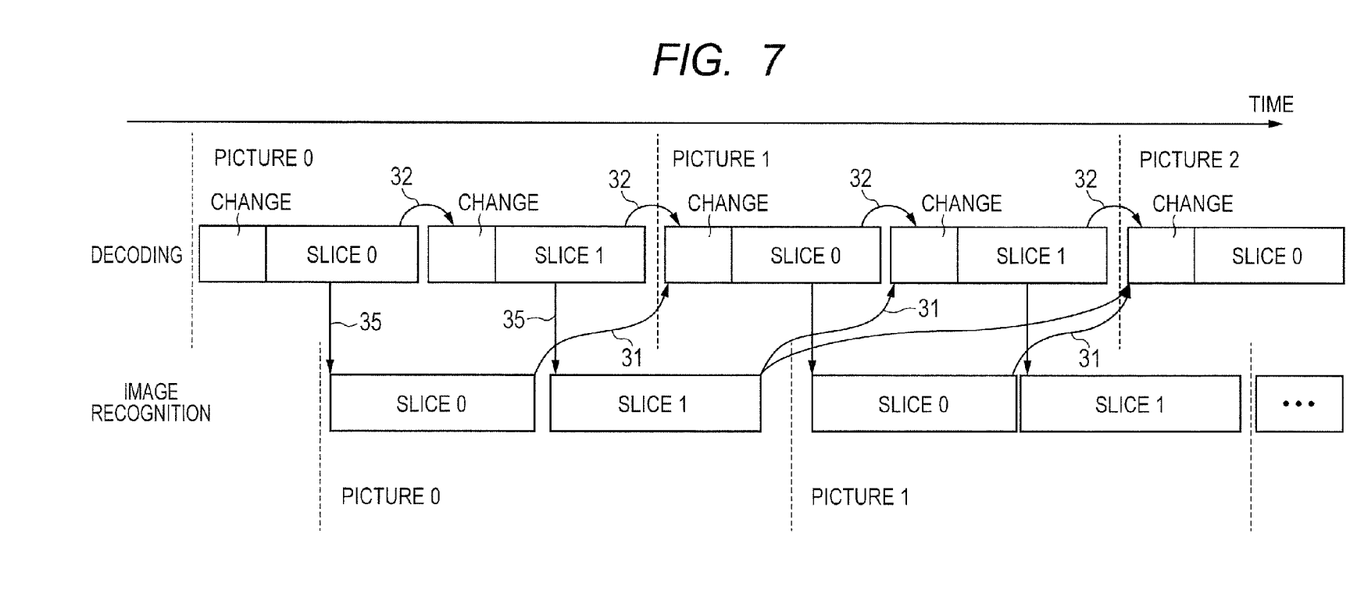
FIG. 7 is a timing chart schematically showing another example of the parameter changing operation and the decoding operation (feedback for each slice)

Operation examples of the parameter change and decoding will be described below. FIGS. 6 and 7 are timing charts schematically showing the operation examples of the parameter change and decoding. FIG. 6 shows a feedback example at the picture level. FIG. 7 shows a feedback example at the slice level. The horizontal axis indicates a time, "decoding" denotes the operations of the parameter changing unit 12 and the decoder 13, and "image recognition" denotes the operation of the image recognition unit 14.

FIG. 6 is a timing chart schematically showing an operation example of the parameter change and decoding (feedback for each picture). "Change" denotes changing of the parameter by the parameter changing unit 12. "Picture 0 processing", "picture 1 processing", and "picture 2 processing" of "decoding" in the upper row denote decoding by the decoder 13. "Image recognition" in the lower row denotes image recognition by the image recognition unit 14. "Picture 0 processing" and "picture 1 processing" shown in the lower row denote image recognition in which numbered pictures are subjected to image recognition.

After the parameter change ("Change" in FIG. 6) for the parameter of a picture 0, decoding on the picture 0 ("Picture 0 processing" in FIG. 6) is started. Decoding is performed in processing units, e.g., macro blocks. The output of the picture processing result 35 from the processed macro block to the image recognition unit 14 is started. After the picture processing result 35 is outputted, the image recognition unit 14 starts image recognition on the picture 0 ("Picture 0 processing" in FIG. 6). After the completion of decoding of the picture 0, a parameter change ("Change" in FIG. 6) for the parameter of the subsequent picture 1 and the subsequent decoding ("Picture 1 processing" in FIG. 6) are started using the statistical information 32 obtained by decoding the picture 0. After the picture processing result 35 on the picture 1 is outputted, the image recognition unit 14 starts image recognition ("Picture 1 processing" in FIG. 6) on the picture 1. After the completion of decoding of the picture 1, a parameter change ("Change" in FIG. 6) for the parameter of the picture 2 and the subsequent decoding are started. In the parameter change for the parameter of the picture 2, the index 31 indicating the accuracy of image recognition is fed back in addition to the statistical information 32 obtained by decoding the picture 1 ("Picture 1 processing" in FIG. 6), the index 31 being obtained by image recognition ("Picture 0 processing" in FIG. 6) on the picture 0.

FIG. 7 is a timing chart schematically showing another operation example of the parameter change and decoding (feedback for each slice). In this example, one picture includes two slices. "Change" denotes a parameter change by the parameter changing unit 12, including a parameter change at the slice level. As indicated by "decoding" in the upper row, the parameter is changed and decoding is performed for the slice 0 of the picture 0 and then for the slice 1. After that, the parameter is changed and decoding is performed sequentially for the slices 0 and 1 of the pictures 1, 2, and so on.

As indicated by "image recognition" in the lower row, the image recognition unit 14 starts image recognition on the slice 0 of the picture 0 when receiving the slicing result on the slice 0 of the picture 0, and the image recognition unit 14 starts image recognition on the slice 1 of the picture 0 when receiving the slicing result 35 on the slice 1 of the picture 0. After that, image recognition is performed sequentially on the slices 0 and 1 of the pictures 1, 2, and so on. The statistical information 32 obtained by decoding the slice 0 is fed back to a parameter change from the slice 0 to the subsequent slice 1 in the same picture, whereas the statistical information 32 obtained by decoding the slice 0 is fed back to a parameter change for the slice 0 of the subsequent picture. Regarding the index 31 that is obtained by image recognition and indicates the accuracy of image recognition, the information 31 obtained by the slice 0 of the picture 0 is fed back to a parameter change for the slice 0 of the picture 1, and the information obtained by the slice 1 of the picture 0 is fed back to a parameter change for the slice 1 of the picture 1. The information 31 obtained from the slice 1 of the picture 0 can be fed back to a parameter change for the subsequent picture 2.

As shown in FIG. 7, if decoding is possible at the slice level, the index 31 indicating the accuracy of the recognition result of the image recognition unit 14 is applicable to the subsequent slicing in addition to (1) and (2).

FIGS. 6 and 7 show timing when decoding by the decoder 13 requires substantially the same time period as image recognition by the image recognition unit 14. In the present invention, detection and an improvement in recognition can be quickly fed back in a certain period regardless of a delay of a communication channel.

The effects of the present invention will be described below.

If the present invention is applied to an advanced driver assistance system (ADAS), the image receiving device 1 according to the present embodiment acts as an endpoint for controlling navigation and so on. A camera image is encoded by a transmitting unit, and then the encoded camera image (image encoding stream) is transmitted to the image receiving device 1 through a communication channel of Ethernet (registered trademark), CAN, and so on. In the present invention, an improvement in recognition rate can be quickly fed back in a certain period regardless of a delay of the communication channel.

Moreover, in an application for recognizing an object from encoded data that is accumulated without a communication channel network, an image is recognized according to the present invention. Also in a system that cannot change the encoding parameter, an image recognition rate can be improved.

The accuracy of recognition can be improved by changing the parameter, though the recognized image is not identical to a correct decoded image that is assumed by the transmitting device. Error propagation is prevented unless a decoded image is used as a reference image. Thus, encoding by a sender is not affected.

[Second Embodiment]

Figure 8:
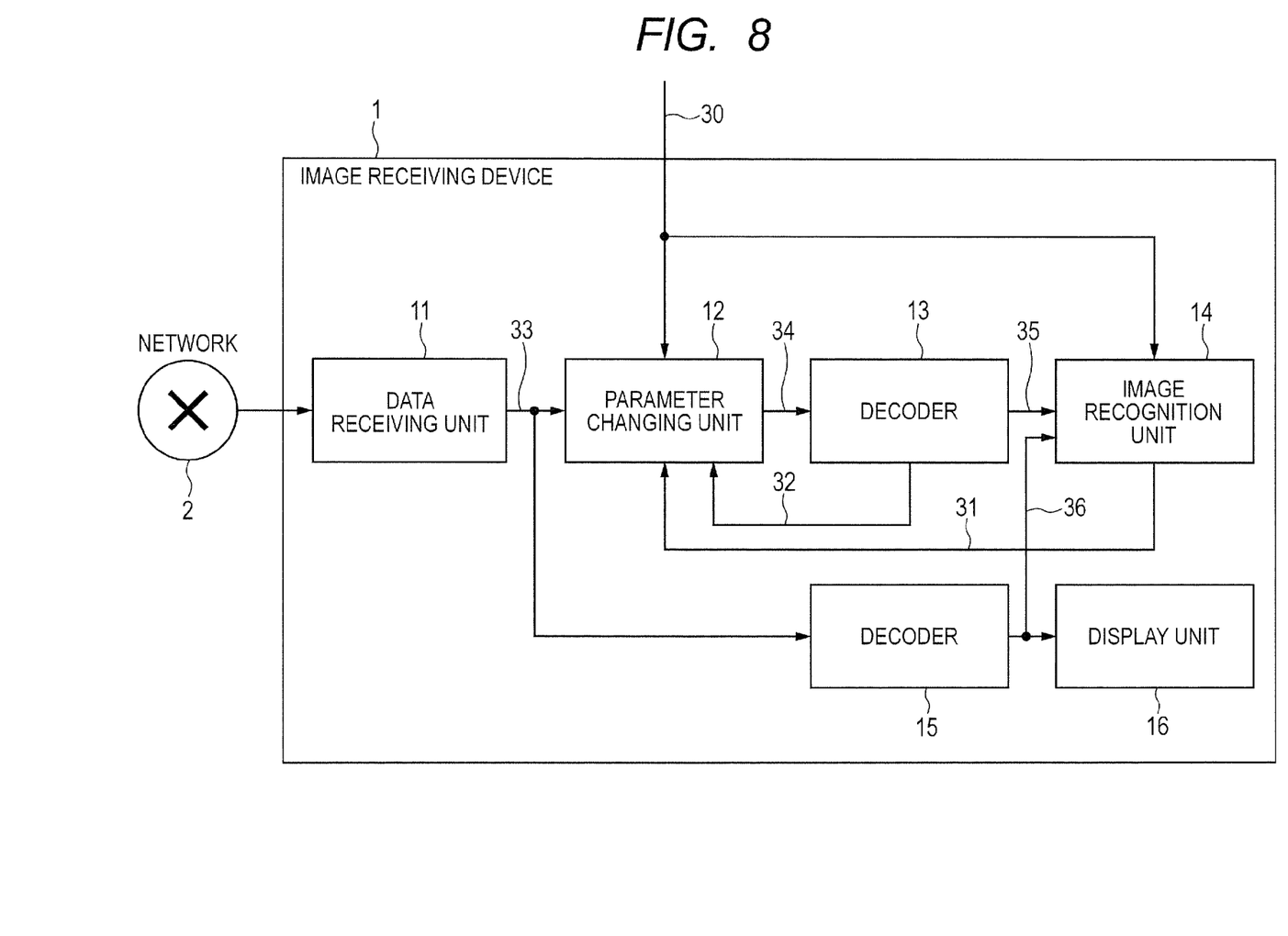
FIG. 8 is a block diagram showing a configuration example of an image receiving device according to a second embodiment.

FIG. 8 is a block diagram showing a configuration example of an image receiving device according to a second embodiment.

An image receiving device 1 includes, like the image receiving device 1 according to the first embodiment shown in FIG. 1, a data receiving unit 11, a parameter changing unit 12, a decoder 13, and an image recognition unit 14. The image receiving device 1 further includes a decoder 15 and a display unit 16. The configurations and operations of the data receiving unit 11, the parameter changing unit 12, the decoder 13, and the image recognition unit 14 are similar to those of the first embodiment and thus the explanation thereof is omitted. The added decoder 15 receives an image encoding stream 33 without changing a parameter. Hence, the decoder 15 decodes a decoding parameter with emphasis on normal visibility. A decoded image output 36 is supplied to the display unit 16 and is displayed thereon.

Thus, the image recognition unit receives image decoding data that is decoded using a parameter changed suitably for image recognition, whereas the display unit receives image decoding data that is decoded using a parameter suitable for display before the parameter is changed. This applies the proper parameters to the respective units.

The image recognition unit 14 according to the second embodiment can be expanded so as to receive the decoded image output 36 of the decoder 15 in addition to a decoded image output 35 of the decoder 13. The decoded image output 35 with a changed parameter and the decoded image output 36 with an unchanged parameter are both used for image recognition, allowing the image recognition unit 14 to further increase the accuracy of recognition. For example, a difference is calculated for each pixel in the decoded image output 35 with a forcibly turned-off deblocking filter and the decoded image output 36 having undergone deblocking filtering as designated by an encoder. This can extract edge information around pixels that are subjected to deblocking filtering.

As shown in FIG. 8, the two decoders 13 and 15 may be independently arranged or one of the decoders may be operated in a time sharing manner. If the throughput of the decoder 13 exceeds the necessary recognition capability of the image recognition unit 14, the multiple decoded image outputs 35 may be used for image recognition by operating the decoder 13 in a time sharing manner.

According to the second embodiment, an image can be displayed (recognized by a person) while an image recognition rate is improved by the method of the first embodiment. Moreover, a plurality of decoded images are inputted to the image recognition unit, contributing to an increase in the accuracy of recognition.

Furthermore, it can be understood that another input image (data) for image recognition and tracking is created by changing the parameter. Specifically, a decoded image may not be identical to a correct decoded image that is assumed by the transmitting device and an error may be propagated by a decoded image used as a reference image. Even if a decoded image decreases in image quality, motion information remains in a screen and is usable for recognition.

In the first embodiment, error propagation is prevented unless a decoded image is used as a reference image. Thus, encoding by a sender is not affected. In the present embodiment, changing the parameter may include an intra-screen prediction and a reference image (not limited to an intra-screen prediction and the absence of a deblocking filter).

[Third Embodiment]

Figure 9:
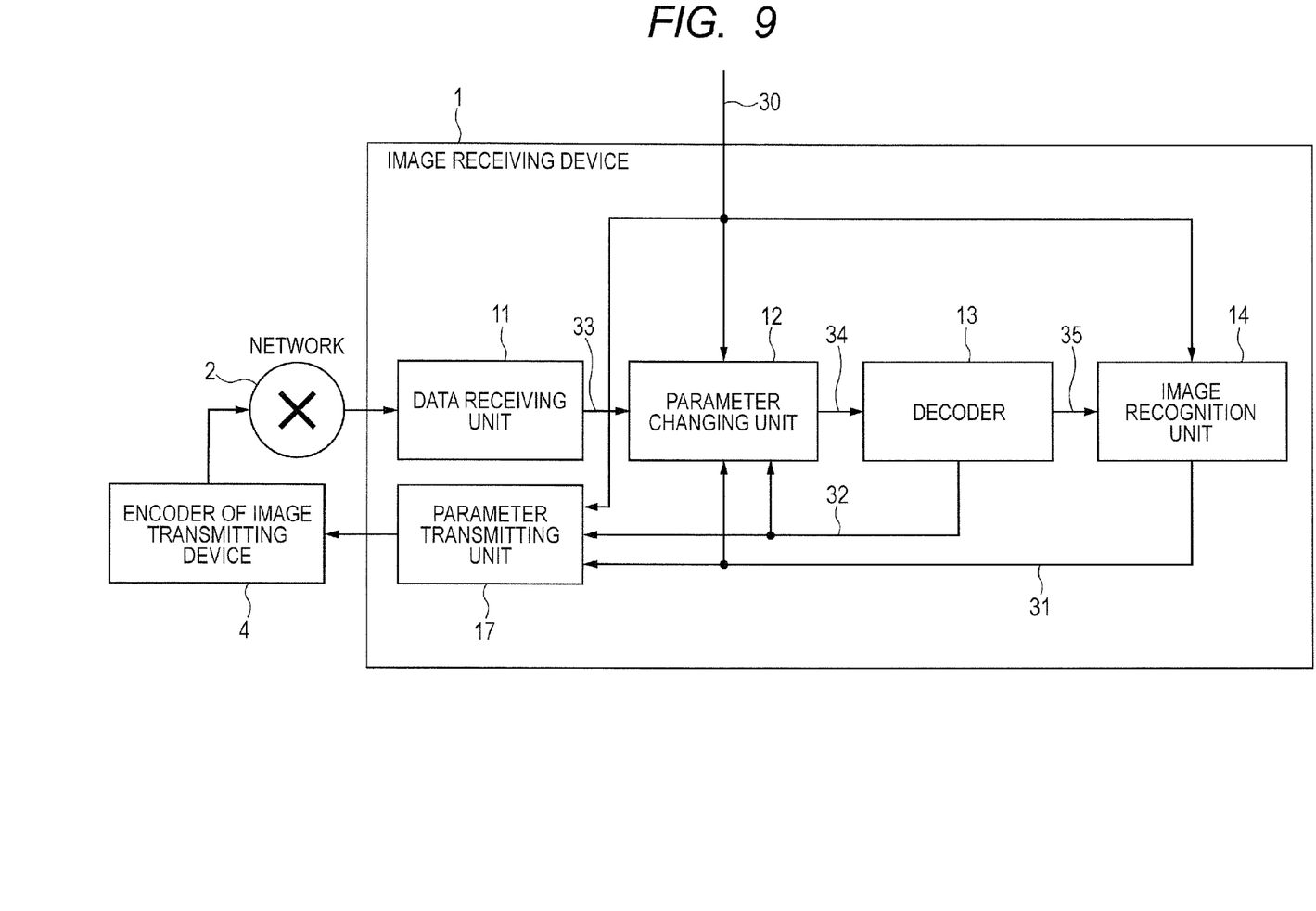
FIG. 9 is a block diagram showing a configuration example of an image receiving device according to a third embodiment.

FIG. 9 is a block diagram showing a configuration example of an image receiving device according to a third embodiment.

An image receiving device 1 includes, like the image receiving device 1 according to the first embodiment shown in FIG. 1, a data receiving unit 11, a parameter changing unit 12, a decoder 13, and an image recognition unit 14. The image receiving device 1 further includes a parameter transmitting unit 17. The configurations and operations of the data receiving unit 11, the parameter changing unit 12, the decoder 13, and the image recognition unit 14 are similar to those of the first embodiment and thus the explanation thereof is omitted. The added parameter transmitting unit 17 receives, for example, an index 31 indicating the accuracy of the recognition result of the image recognition unit 14 and statistical information 32 obtained by decoding, and then the parameter transmitting unit 17 outputs the index 31 and the statistical information 32 to an encoder 4 in the image transmitting device. Feedback to a sender assist a measurement of the index indicating the accuracy of the recognition result of the image recognition unit. In the encoder 4 of the image transmitting device, a parameter for encoding can be changed to a value suitable for image recognition in the image receiving device 1.

Feedback control in a short time may involve the operations discussed in accordance with FIGS. 6 and 7 in the first embodiment. In the case of feedback control over an extended period of time, the parameter transmitting unit 17 in FIG. 9 is used. If an encoding mode can be selected by an encoding unit (encoder 4) under feedback control, the function of assisting measurement of the index 31 indicating the accuracy of a recognition result is provided, achieving more accurate feedback. In other words, an image encoding stream is transmitted with a parameter more suitable for image recognition, thereby improving the accuracy of image recognition in the image receiving device 1.

Switching between feedback in the image receiving device 1 according to the first embodiment and additional feedback out of the image receiving device 1, that is, to the encoder 4 according to the third embodiment is controlled as follows:

For example, as a method of switching the destination of feedback, a delay time is determined according to time information contained in an image encoding stream 33, and then feedback in the image receiving device 1 and feedback to the image transmitting device (encoder 4) are switched. Alternatively, feedback in the image receiving device 1 may be used until a reaction of the encoder 4, and then the feedback may be switched to feedback to the image transmitting device (encoder 4). This can reduce a switching time lag.

The invention made by the present inventors was specifically described according to the embodiments. Needless to say, the present invention is not limited to the embodiments and thus can be changed in various ways within the scope of the invention.

For example, functional blocks constituting the image receiving device are not limited to the disclosed division of blocks. The dividing pattern may be optionally changed, for example, at least some of the functions may be contained in another block. Moreover, the functional blocks may be mounted by hardware, e.g., a semiconductor IC, may be mounted as software operating on a processor, or may be mounted in combination.

What is claimed is:

1. An image receiving device comprising:
a data receiving unit;
a parameter changing unit;
a decoding unit; and
an image recognition unit,
the data receiving unit receiving an image encoding stream including image encoding data and a parameter, the image encoding stream comprising an elementary stream, the image encoding data comprising an encoded image, and the parameter comprising an encoding parameter in accordance with which an image is encoded to generate the encoded image,
the parameter changing unit being configured to change the parameter in the image encoding stream received by the data receiving unit so as to increase accuracy of image recognition performed by the image recognition unit,
the decoding unit generating image decoding data, the image decoding data comprising a decoded image, by decoding the image encoding stream including the image encoding data received by the data receiving unit and the parameter changed by the parameter changing unit, using the parameter changed by the parameter changing unit as a decoding parameter,
the image recognition unit performing the image recognition on the image decoding data, and
wherein in a process of the image recognition, the image recognition unit calculates an index indicating the accuracy of image recognition, and the parameter changing unit changes the parameter received by the data receiving unit, based on the index indicating the accuracy of image recognition calculated in the process of image recognition.

2. The image receiving device according to claim 1,
wherein the parameter changing unit changes the parameter received by the data receiving unit, based on environmental information of the image receiving device.

3. The image receiving device according to claim 2,
wherein the image receiving device is mounted on a vehicle, the image acquired by a camera mounted on the vehicle is encoded by an image encoding device, the image encoding stream generated by encoding the image is received by the data receiving unit, and the parameter changing unit changes, according to a running condition of the vehicle, the parameter received by the data receiving unit.

4. The image receiving device according to claim 1,
wherein the decoding unit includes a deblocking filter, and the parameter changing unit changes, as the parameter received by the data receiving unit, at least one of a parameter indicating whether to use the deblocking filter for the image encoding data and a filter coefficient of the deblocking filter.

5. The image receiving device according to claim 1,
wherein the decoding unit includes an inverse quantization unit, the parameter contains a quantization parameter for quantization included in encoding for generating the image encoding data, and the parameter changing unit changes the quantization parameter contained in the parameter received by the data receiving unit and then supplies the quantization parameter to the inverse quantization unit.

6. The image receiving device according to claim 1,
wherein the decoding unit includes an orthogonal inverse transform unit, the parameter contains an orthogonal transform coefficient for orthogonal transformation included in encoding for generating the image encoding data, and the parameter changing unit changes the orthogonal transform coefficient contained in the parameter received by the data receiving unit and then supplies the coefficient to the orthogonal inverse transform unit.

7. The image receiving device according to claim 1,
wherein the image receiving device further includes a parameter transmitting unit, the image recognition unit calculates an index indicating accuracy of image recognition in a process of image recognition, the parameter changing unit changes the parameter received by the data receiving unit, according to the index indicating the accuracy of image recognition calculated in the process of image recognition, and the parameter transmitting unit transmits, to the image transmitting device having generated and transmitted the image encoding stream, the index indicating the accuracy of image recognition calculated in the process of image recognition.

8. The image receiving device according to claim 7, wherein the parameter changing unit changes, based on environmental information of the image receiving device, the parameter received by the data receiving unit, and the parameter transmitting unit transmits, to the image transmitting device having generated and transmitted the image encoding stream, an index indicating the environmental information of the image receiving device.

9. The image receiving device according to claim 8, wherein the image receiving device is mounted on a vehicle, an image acquired by a camera mounted on the vehicle is encoded by an image encoding device, the image encoding stream generated by encoding the image is received by the data receiving unit, the parameter changing unit changes, according to a running condition of the vehicle, the parameter received by the data receiving unit, and the parameter transmitting unit transmits, to the image transmitting device having generated and transmitted the image encoding stream, an index indicating the running condition of the vehicle.

10. The image receiving device according to claim 1, further comprising another decoding unit and a display unit, wherein the data receiving unit supplies the received image encoding stream to the another decoding unit, the another decoding unit decodes, according to the parameter included in the image encoding stream, the image encoding data included in the image encoding stream, generates another image decoding data, and supplies the image decoding data to the display unit.

11. An image transmission system comprising:
the image receiving device according to claim 1, and
an image transmitting device including an image encoding device that receives, as the image, an original image and generates the image encoding data by encoding the original image according to the encoding parameter corresponding to the parameter, the image transmitting device supplying the image encoding stream to the image receiving device.

12. The image transmission system according to claim 11, wherein the image transmission system is mounted on a vehicle including a camera that acquires a surrounding image as the original image and an on-board network, and
the image transmitting device and the image receiving device are coupled to each other so as to communicate with each other via the on-board network.

13. An image receiving method in which a data receiving unit, a parameter changing unit, a decoding unit, and an image recognition unit are provided,
the method comprising:
inputting, to the data receiving unit, an image encoding stream including image encoding data and a parameter, the image encoding stream comprising an elementary stream, the image encoding data comprising an encoded image, and the parameter comprising an encoding parameter in accordance with which an image is encoded to generate the encoded image;
allowing the parameter changing unit to change the parameter in the image encoding stream received by the data receiving unit so as to increase an accuracy of image recognition performed by the image recognition unit;
generating image decoding data, the image decoding data comprising a decoded image, by decoding, in the decoding unit, the image encoding stream including the image encoding data received by the data receiving unit and the parameter changed by the parameter changing unit, using the parameter changed by the parameter changing unit as a decoding parameter; and
allowing the image recognition unit to perform image recognition on the image decoding data,
wherein in the image recognition, the image recognition unit calculates an index indicating accuracy of image recognition, and the parameter changing unit changes the parameter inputted to the data receiving unit, based on the index indicating the accuracy of image recognition calculated in the image recognition.

14. The image receiving method according to claim 13, wherein the parameter changing unit changes the parameter received by the data receiving unit, based on environmental information of an image receiving device according to the image receiving method.

15. The image receiving method according to claim 14, wherein the image receiving device is mounted on a vehicle, the image acquired by a camera mounted on the vehicle is encoded by an image encoding device, the image encoding stream generated by encoding the image is received by the data receiving unit, and the parameter changing unit changes, according to a running condition of the vehicle, the parameter received by the data receiving unit.

16. The image receiving method according to claim 13, wherein the decoding unit includes a deblocking filter, and the parameter changing unit changes, as the parameter received by the data receiving unit, at least one of a parameter indicating whether to use the deblocking filter for the image encoding data and a filter coefficient of the deblocking filter.

17. The image receiving method according to claim 13, wherein the decoding unit includes an inverse quantization unit, the parameter contains a quantization parameter for quantization included in encoding for generating the image encoding data, and the parameter changing unit changes the quantization parameter contained in the parameter received by the data receiving unit and then supplies the quantization parameter to the inverse quantization unit.

18. The image receiving method according to claim 13, wherein the decoding unit includes an orthogonal inverse transform unit, the parameter contains an orthogonal transform coefficient for orthogonal transformation included in encoding for generating the image encoding data, and the parameter changing unit changes the orthogonal transform coefficient contained in the parameter received by the data receiving unit and then supplies the coefficient to the orthogonal inverse transform unit.

* * * * *